United States Patent [19]

Pipes

[11] Patent Number: 5,005,912

[45] Date of Patent: Apr. 9, 1991

[54] WHEEL MOUNTING ASSEMBLY FOR A STORAGE AND RETRIEVAL MACHINE

[75] Inventor: George R. Pipes, Salt Lake City, Utah

[73] Assignee: Eaton-Kenway, Inc., Salt Lake City, Utah

[21] Appl. No.: 415,738

[22] Filed: Oct. 2, 1989

[51] Int. Cl.[5] .............................................. B60B 35/10

[52] U.S. Cl. ........................................ 301/111; 301/1; 105/220

[58] Field of Search ............... 301/1, 111, 114, 124 R, 301/124 H, 126, 128, 131; 104/33; 105/170, 218.1, 220; 295/43, 42.1, 42

[56] References Cited

U.S. PATENT DOCUMENTS

| | | | |
|---|---|---|---|
| 1,007,472 | 10/1911 | McCauley | 105/220 |
| 1,376,684 | 5/1921 | Doerr | 105/220 |
| 4,773,691 | 9/1988 | Bernd et al. | 105/218.1 X |

FOREIGN PATENT DOCUMENTS

| | | | |
|---|---|---|---|
| 970631 | 9/1964 | United Kingdom | 105/218.1 |

*Primary Examiner*—Russell D. Stormer
*Attorney, Agent, or Firm*—F. M. Sajovec

[57] ABSTRACT

A wheel mounting assembly for a rail-supported storage/retrieval machine. The drive and idler wheels are each mounted on a removable module which includes a fixed plate having a concave spherical surface formed in it and movable plate to which the wheel is mounted having a convex spherical surface interfitting with the concave surface on the fixed plate to define a spherical joint. The plates are interconnected by bolts fitting loosely in oversize holes formed in the fixed plate and threaded into the movable plate to provide limited relative movement of the plates about a plurality of axes. Four jackscrews arranged in pairs on opposite sides of the movable plate are threaded through a frame holding the first plate and bear against the sides of the second plate. Simultaneous tightening and loosening among combinations of the four jackscrews provides horizontal and vertical alignment of the wheel relative to the rail on which the machine is supported. After proper alignment is achieved the bolts are tightened to provide a clamping force between the spherical surfaces.

10 Claims, 4 Drawing Sheets

WHEEL MOUNTING ASSEMBLY FOR A STORAGE AND RETRIEVAL MACHINE

The present invention relates to storage and retrieval (S/R) machines, and more particularly to apparatus for mounting the drive and idler wheels of such machines.

A typical storage and retrieval machine travels on a single floor-mounted rail in an aisle between rows of storage racks. The machine comprises a base member, and a vertical mast secured to the base, which mast can be as tall as 100 ft. or more. The base member is supported on the rail by a drive wheel at one end of the base member and an idler wheel at the other end. The machine is stabilized by guide wheels at the top of the mast which engage an overhead rail.

To insure smooth operation and minimal maintenance, it is important that the drive and idler wheels be accurately aligned, both vertically and longitudinally.

Heretofore, alignment of the drive and idler wheels has involved trial and error procedures using shims between mounting components of the wheels and the machine frame, as well as specialized gauges to determine the direction and extent of misalignment.

The present invention provides a simple, yet effective apparatus for mounting and aligning the drive and idler wheels of an S/R machine. More specifically, the invention provideS a Wheel mounting module attached to the machine which provides a spherical interface between the base and the wheel and means for manipulating the interfaced members to provide simple and accurate alignment therebetween. In accordance with the invention the wheel is supported by pillow blocks fixed to a domed plate which interfits with a spherical concave surface formed in a cap member attached to the frame of the module. The relative positions of the spherical members is adjusted by means of jackscrews to align the wheel both vertically and longitudinally with respect to the supporting rail. After the alignment is completed the dome and cap are clamped together by means of angularly mounted lock screws.

Other objects and advantages of the invention will be apparent from the following description when considered in connection with the accompanying drawings, wherein.

Figure 1:
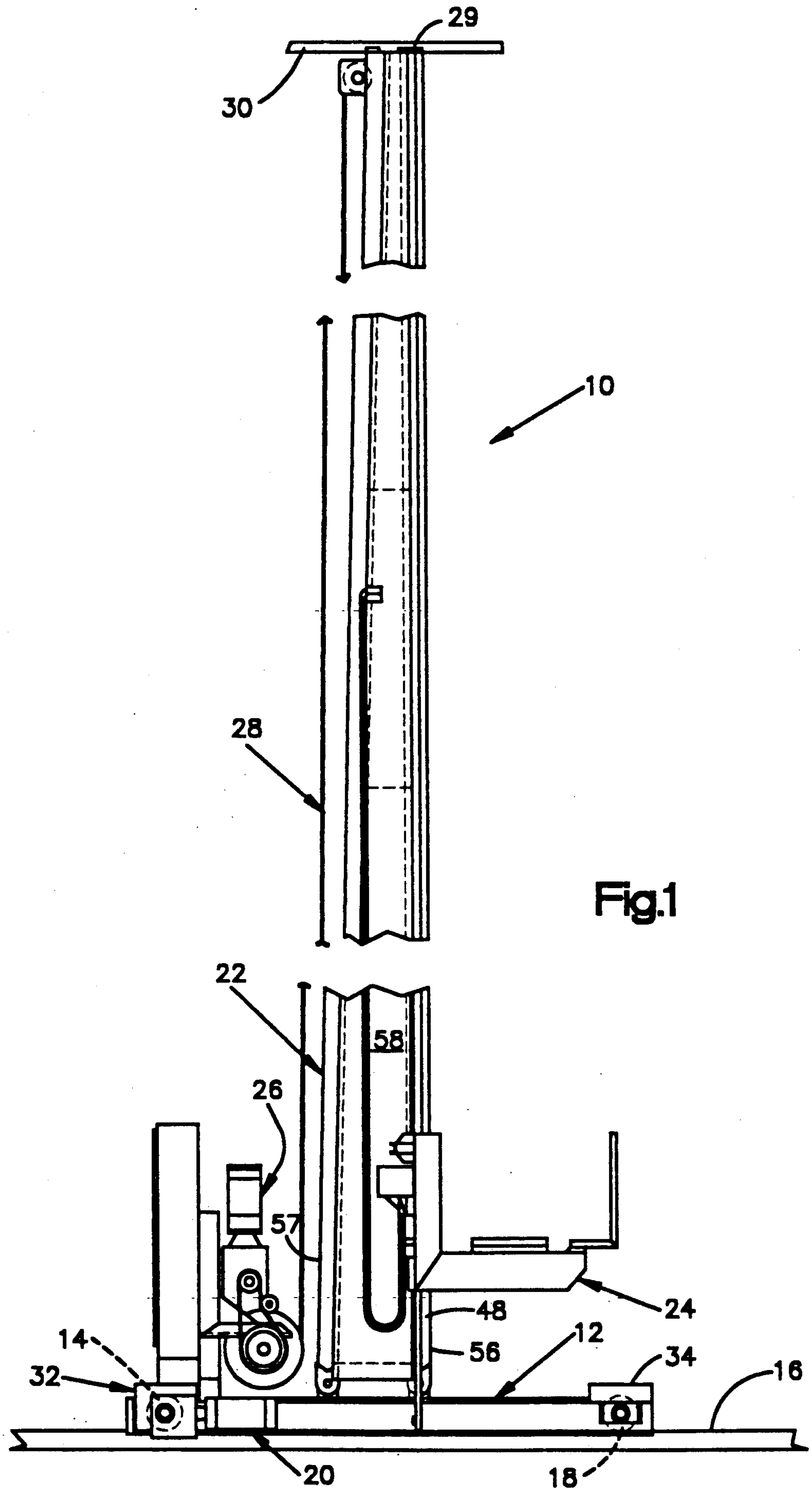
FIG. 1 is a side elevation view of a storage and retrieval machine incorporating the invention.

Referring to FIG. 1 there is illustrated an S/R machine 10 comprising a base assembly 12, a drive wheel 14 mounted for rotation on the frame 12 and engageable with a floor supported rail 16, an idler wheel 18 mounted for rotation on the frame and engageable with the rail 16, a drive motor assembly 20 mounted on the frame and operatively connected to the drive wheel to drive the S/R machine along the rail, a mast assembly 22 mounted to the frame, a load carriage assembly 24 mounted to the mast assembly for vertical movement, and a vertical drive assembly 26 mounted on the frame and operable to drive the load carriage up and down the mast by means of a cable system 28. The vehicle is stabilized by means of horizontal guide wheels 29 which engage an overhead rail 30.

In accordance with the invention the drive wheel 14 and the idler wheel 18 are mounted on modules 32 and 34 respectively which are bolted or other wise removably attached to the base assembly 12. Except for the incorporation of the driven motor assembly into the drive wheel module 32, the drive wheel module and the idler wheel module 34 are essentially identical, and only the idler wheel module will be described in detail herein.

Figure 2:
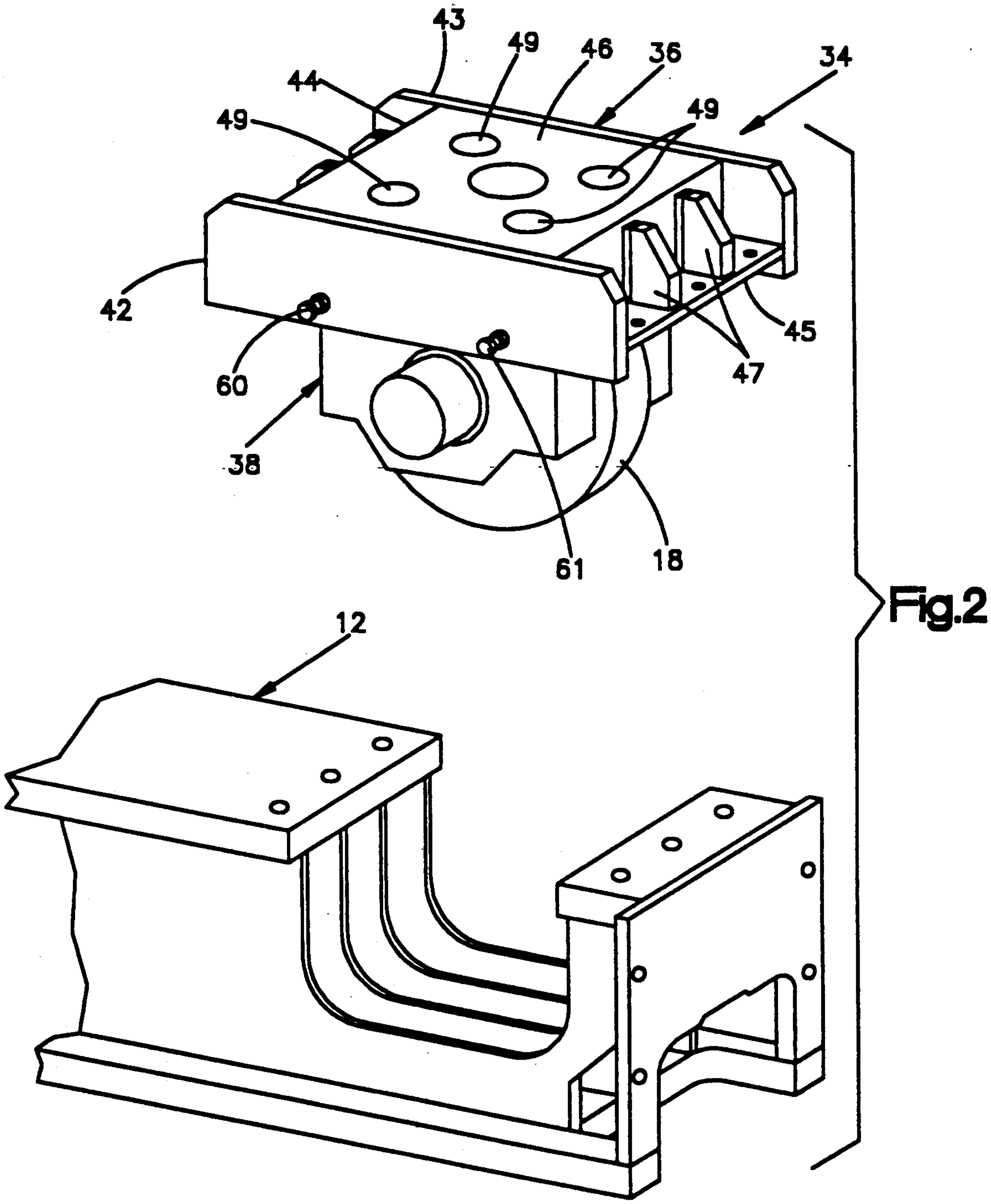
FIG. 2 is an exploded view of a wheel mounting module of the invention.
Figure 3:
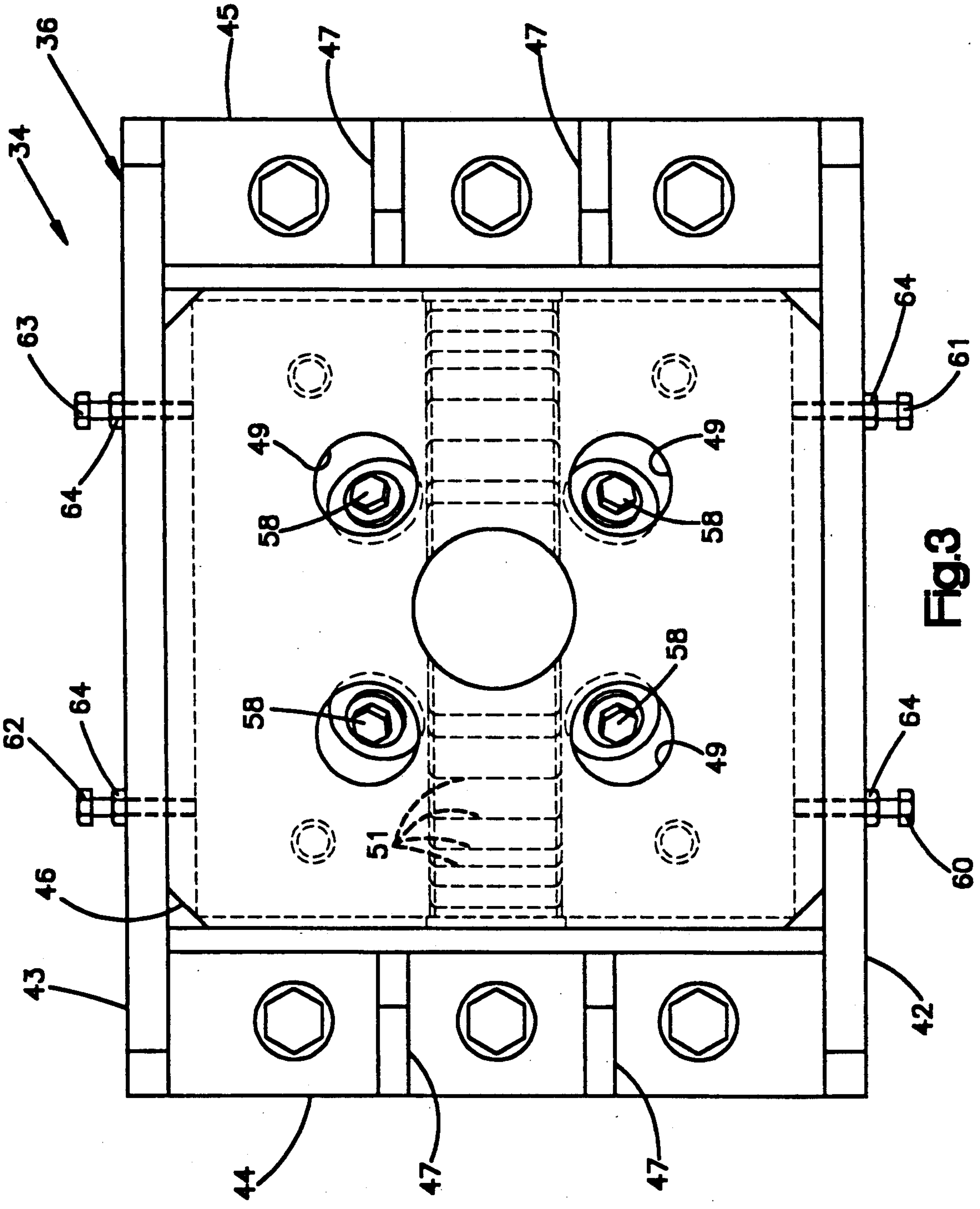
FIG. 3 is a plan view of the module shown in FIG. 2.
Figure 4:
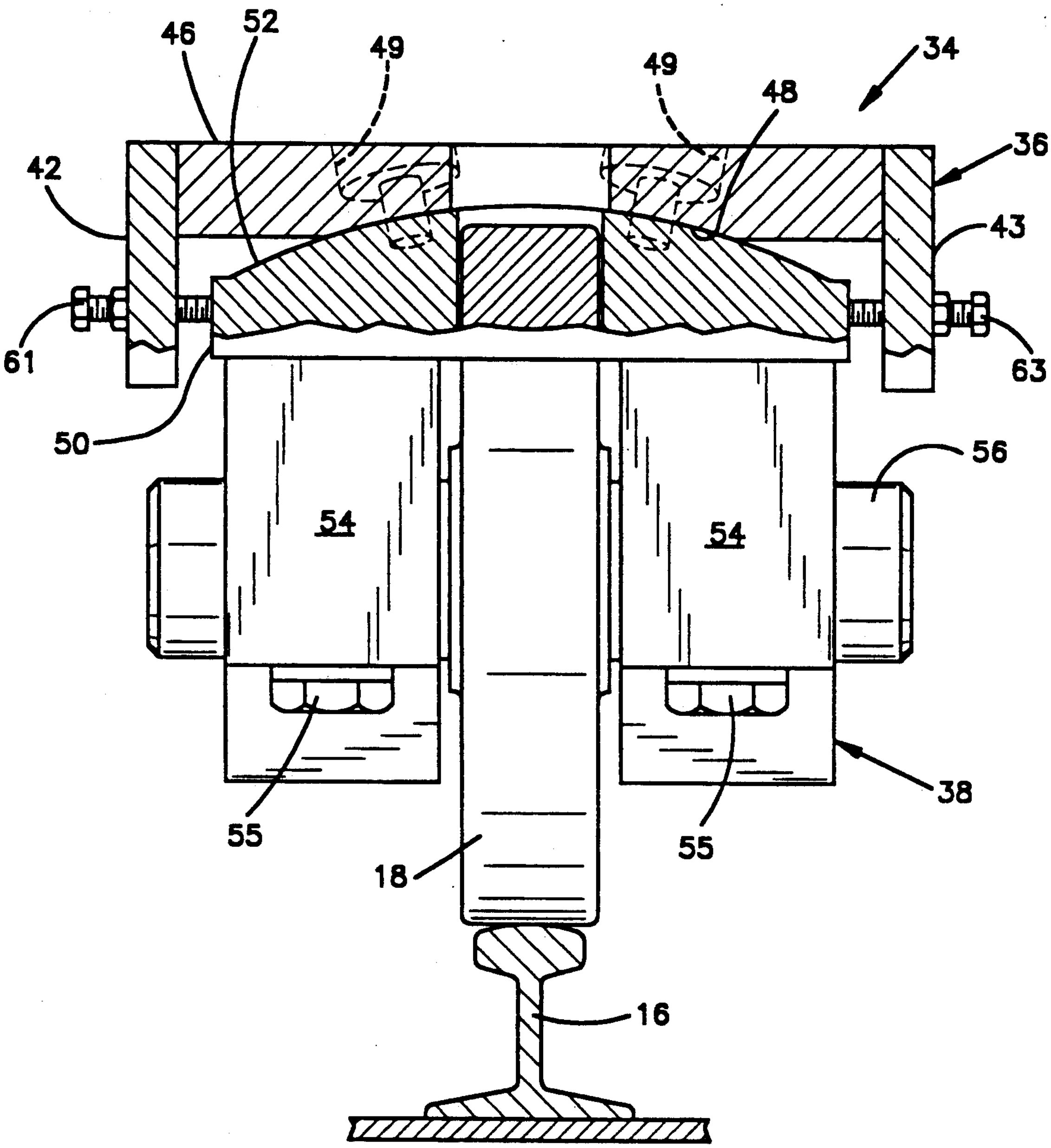
FIG. 4 is an end elevation view of the module with parts shown in section.

Referring to FIGS. 2, 3 and 4 the idler wheel module 34 comprises a frame 36 which is bolted to the base 12, and a wheel assembly 38 which is adjustably mounted on the frame 36. The frame 36 comprises a pair of side plates 42 and 43, a pair of transverse angle members 44 and 45 welded to the side plates, a mounting plate 46, which is welded to the side plates and to which the wheel assembly is attached, and a plurality of stiffeners 47 welded to the angle members. The mounting plate 46 comprises a solid metal plate having a concave spherical surface 48 formed in the underside thereof, and having four counterbored holes 49 formed therein and extending radially through the spherical surface.

Referring particularly to FIG. 4, the wheel assembly 38 comprises a plate 50 having a convex spherical surface 52 formed thereon, a pair of pillow blocks 54 attached to the plate 50 by means of bolts 55, an axle 56 received for rotation in the pillow blocks, and wheel 18 fixed to the axle. The center area of the plate 50 is relieved in a series of steps, indicated typically by the broken lines 51 in FIG. 3 to provide clearance for the wheel 18.

The convex surface 52 of the plate 50 and the concave surface 48 of the plate 46 interfit to form a spherical joint, with the plate 46 maintained in a fixed position, and the plate 50 free to rotate in any direction about the centerpoint of the spherical surfaces.

The wheel assembly 38 is attached to the mounting plate 46 by means of four screws 58 which are received through the holes 49 and threaded into holes formed in the plate 50, the holes 49 being oversize to permit limited movement of the plate 50 with respect to the plate 46 prior to tightening the screws. Alignment of the wheel assembly 38 with the rail 16 is effected by means of jackscrews 60 and 61 which are threaded through side plate 42 and bear against one side of plate 50, and jackscrews 62 and 63 which are threaded through side plate 43 and bear against the opposite side of plate 50.

To align the wheel assembly horizontally, that is to insure that the axis of rotation of the wheel is perpendicular to the longitudinal axis of the rail, the jackscrews are alternately tightened and loosened diagonally, that is screw 60 against screw 63 and screw 61 against screw 62 to rotate the plate 50 about an axis perpendicular to the surface of the rail.

To align the wheel assembly vertically, that is to insure that the axis of rotation of the wheel is parallel to the rail surface, jackscrews 60 and 61 are tightened or loosened together against jackscrews 62 and 63 to rotate the plate 50 about an axis parallel to the surface of the rail. Once the desired alignment is obtained the jackscrews are locked by means of nuts 64 received between the heads of the jackscrews and the plates 42 and 43 and the screws 58 are tightened to clamp plates 46 and 50 together.

It can be appreciated that the modules 32 and 34 are easily accessible for adjustment when the vehicle 10 is initially erected in the field and for periodic readjustment as required.

I claim:

1. In a storage/retrieval machine comprising a base; a mast assembly attached to said base; at least one wheel mounted for rotation on said base and supporting said machine on a floor-mounted rail; and means for mounting said wheel to said base comprising a first mounting member mounted in fixed relation to said base, a second mounting member movably mounted on said first mounting member, means rotatably mounting said wheel on said second mounting member, and means for moving said second mounting member relative to said first mounting member about a plurality of axes; the improvement comprising means defining a spherical joint between said first mounting member and said second mounting member.

2. In a storage/retrieval machine comprising a base; a mast assembly attached to said base; at least one wheel mounted for rotation on said base and supporting said machine on a floor-mounted rail; and a wheel mounting module removably mounted on said base; said module comprising a frame, means for removably attaching said frame to said base, a first mounting member fixed to said frame, a second mounting member movably mounted on said first mounting member, means rotatably mounting said wheel on said second mounting member, and means for moving said second mounting member relative to said first mounting member about a plurality of axes; the improvement comprising means defining a spherical joint between said first mounting member and said second mounting member.

3. Apparatus as claimed in either of claims 1 or 2, including means for selectively maintaining said first and second mounting members in fixed relationship to one another in a plurality of relative orientations.

4. Apparatus as claimed in either of claims 1 or 2, in which said first mounting member comprises a first plate having a concave spherical surface formed in one face thereof, and said second mounting member comprises a second plate having a convex spherical surface formed in one face thereof and in engagement with the concave spherical surface of said first plate.

5. Apparatus as claimed in claim 4, in which said second plate includes first and second engagement surfaces formed thereon said means for moving said second mounting member about a plurality of axes comprising adjustment means mounted in fixed relation to said first plate and engageable with said engagement surfaces on said second plate.

6. Apparatus as claimed in claim 4, in which said first and second engagement surfaces are defined by surfaces parallel to a plane through said wheel perpendicular to the axis of rotation of said wheel and disposed on opposite sides of said plane.

7. Apparatus as claimed in claim 6, in which said adjustment means comprises first and second threaded means spaced apart along said first engagement surface, and third and fourth threaded means spaced apart along said second engagement surface.

8. Apparatus as claimed in claim 4, including means for selectively maintaining said first and second plates in fixed relationship to one another in a plurality of relative orientations.

9. Apparatus as claimed in claim 8, in which said means for maintaining said first and second plates in fixed relationship comprises a plurality of first holes formed through said first plate and extending radially with respect to the spherical surface formed in said first plate, a plurality of second threaded holes coaxial with the first holes formed in said second plate, and a plurality of threaded fasteners received through said first holes and threaded into said second holes to provide a clamping force between said first and second spherical surfaces.

10. Apparatus as claimed in claim 9, in which said first holes are larger in diameter than said threaded fasteners to provide limited relative movement between said first and second plates about a plurality of axes.

* * * * *